(12) United States Patent  
Staudinger et al.

(10) Patent No.: US 8,700,277 B2  
(45) Date of Patent: Apr. 15, 2014

(54) GEARBOX CONTROL DEVICE

(71) Applicant: ZF Friedrichshafen AG, Friedrichshafen (DE)

(72) Inventors: Joachim Staudinger, Ravensburg (DE); Ingo Sauter, Meckenbeuren (DE); Maik Würthner, Markdorf (DE); Johannes Kemler, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/013,140

(22) Filed: Aug. 29, 2013

(65) Prior Publication Data

US 2013/0345942 A1 Dec. 26, 2013

Related U.S. Application Data

(62) Division of application No. 13/263,858, filed as application No. PCT/EP2010/052809 on Mar. 5, 2010, now Pat. No. 8,527,163.

(30) Foreign Application Priority Data

Apr. 15, 2009 (DE) .......................... 10 2009 002 387

(51) Int. Cl.
  *G06F 17/00* (2006.01)
  *B60W 10/00* (2006.01)

(52) U.S. Cl.
  USPC .............................................. 701/51; 477/91

(58) Field of Classification Search
  USPC ........... 701/65, 95, 55, 51, 56, 58, 54, 61, 66, 701/67, 85, 86, 93, 101, 102, 103, 104, 105, 701/29.1, 29.5; 477/91, 80, 900–905, 120, 477/132, 135, 187, 140, 15, 111, 50, 69, 76, 477/98, 117, 37, 97; 123/288, 258, 292, 123/321, 90.23, 90.4, 146, 336, 348, 47 AB, 123/65 V, 480; 73/593, 660, 820, 114.63, 73/114.41–114.57, 204.19; 74/473.1, 567, 74/117, 821; 340/439
  See application file for complete search history.

(56) References Cited

U.S. PATENT DOCUMENTS 5,832,400 A 11/1998 Takahashi et al.
7,945,365 B2 5/2011 Eisele et al.
(Continued)

FOREIGN PATENT DOCUMENTS

| DE | 196 00 734 A1 | 7/1997 |
| DE | 10 2005 005 379 A1 | 8/2006 |
| DE | 10 2005 049 710 A1 | 4/2007 |
| DE | 10 2005 050 753 A1 | 4/2007 |
| DE | 10 2006 001 818 A1 | 7/2007 |
| DE | 10 2007 054 619 A1 | 6/2008 |
| DE | 10 2007 025 502 A1 | 12/2008 |
| EP | 2419662 * | 2/2012 |

(Continued)

*Primary Examiner* — Muhammad Shafi
(74) *Attorney, Agent, or Firm* — Davis & Bujold, PLLC; Michael J. Bujold

(57) ABSTRACT

A transmission control device (6) for an automatic or automated transmission (2). A shifting strategy of the transmission control device (6) controls and/or regulates the operation of the transmission (2) based on driving condition data such as vehicle mass, driving resistance, vehicle inclination, vehicle velocity, vehicle acceleration, engine rotational speed and/or engine torque, and based on data about the driver's wishes. The transmission control device (6) continuously calculates the driving condition data of the vehicle mass, driving resistance and/or vehicle inclination based on topographic data of a current position of the motor vehicle, and/or the shifting strategy determines a gear change from an actual gear into a target gear based on topographic data of a defined distance ahead of a motor vehicle. The defined distance ahead of the motor vehicle depends on the currently velocity of the vehicle.

6 Claims, 1 Drawing Sheet

(56) References Cited

U.S. PATENT DOCUMENTS

| | | |
|---|---|---|
| 7,949,452 B2 | 5/2011 | Eriksson et al. |
| 2006/0293822 A1* | 12/2006 | Lattemann et al. ............ 701/51 |
| 2008/0119999 A1 | 5/2008 | Tiberg |
| 2008/0274857 A1 | 11/2008 | Wolfgang et al. |

FOREIGN PATENT DOCUMENTS

| | | |
|---|---|---|
| WO | 02/055909 A1 | 7/2002 |
| WO | 03/041988 A1 | 5/2003 |
| WO | 2007/045332 A1 | 4/2007 |
| WO | 2008/145646 A1 | 12/2008 |

* cited by examiner

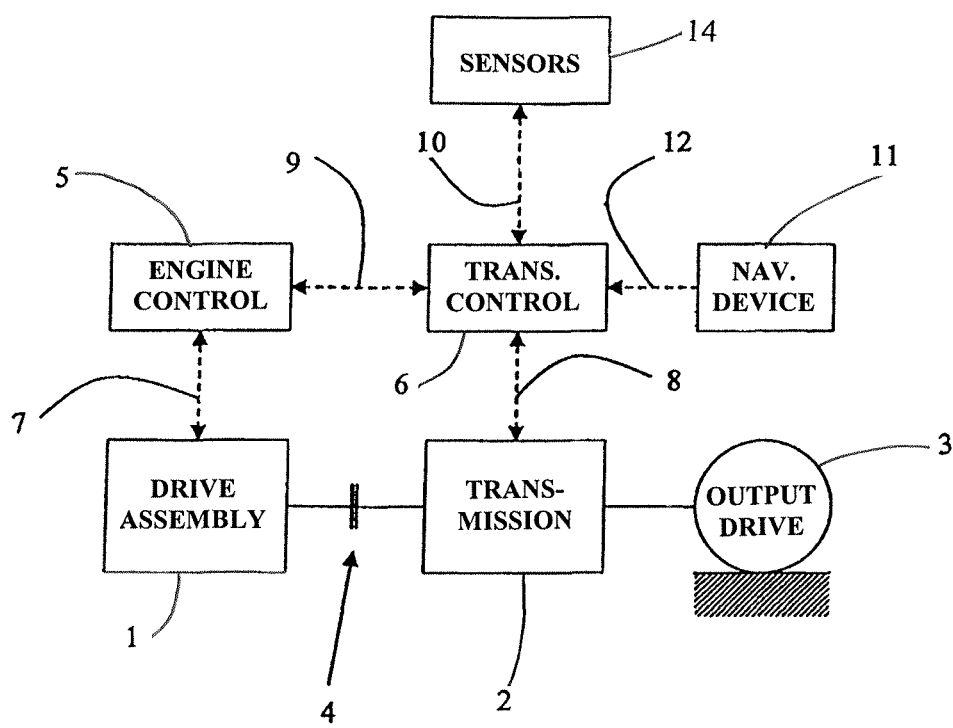

GEARBOX CONTROL DEVICE

This application is a divisional of U.S. patent application Ser. No. 13/263,858 filed Oct. 11, 2011, which is a National Stage completion of PCT/EP2010/052809 filed Mar. 5, 2010, which claims priority from German patent application serial no. 10 2009 002 387.9 filed Apr. 15, 2009.

FIELD OF THE INVENTION

The invention relates to a gearbox control device.

BACKGROUND OF THE INVENTION

The main components of a drive train of a motor vehicle are a drive assembly and a transmission. The transmission converts rotational speeds and torques of the drive assembly, and provides the tractive power of the drive assembly at an output drive of the drive train. The operation of the drive assembly is controlled and/or regulated by an engine control device. The operation of the transmission is controlled and/or regulated by a transmission control device. In a transmission control device, which controls and/or regulates the operation of a motor vehicle transmission preferably built as an automatic, or automated, transmission, a shifting strategy is implemented where the shifting strategy of the transmission control device controls or regulates the operation of the transmission based on the driving condition data and the data of the driver's wish. The shifting strategy determines, in particular, a change of gears from an actual gear to a targeted gear based on the driving condition data and the data of the driver's request.

A transmission control device, disclosed in DE 10 2006 001 818 A1, evaluates the topography of the travel route ahead of the motor vehicle in order to determine a gear change with the support of a computer, for example.

The patent, DE 10 2007 025 502 A1, discloses a transmission control device that controls the transmission depending on information about the environment of the motor vehicle, in particular based on information about route inclines and progressions. In the process, the transmission control device also evaluates information about the environment of the motor vehicle, such as that sent from traffic guidance devices.

Although it is already fundamentally known from the prior art that a transmission control device controls and/or regulates the operation of the transmission based on data concerning the environment of the motor vehicle, in particular on the basis of topographic data, there is a continued need to further improve the operation of a transmission on the basis of such data, in particular to ensure the lowest possible fuel consumption while simultaneously providing the greatest possible agility of the motor vehicle. Therefore, a transmission control device is needed, which further develops transmission control devices known from the prior art, so that the greatest possible vehicle agility is guaranteed with the lowest possible fuel consumption.

SUMMARY OF THE INVENTION

Proceeding therefrom, the problem addressed by the present invention is to create a novel transmission control device.

This objective is solved, according to the first aspect of the invention in which the transmission control device continuously calculates the current vehicle driving condition data, vehicle mass and/or driving resistance and/or vehicle inclination based on the topographic data of a current position of the motor vehicle.

According to the second aspect of the invention, the shifting strategy of the transmission control device determines a gear change from a current actual gear into a targeted gear based on topographic of a defined distance ahead of the current position of the motor vehicle, wherein the defined distance ahead of the current position of the motor vehicle is determined depending on the vehicle velocity.

Both aspects of the present invention provide transmission control devices that guarantee the greatest possible agility of a motor vehicle with the lowest possible fuel consumption. For this purpose, according to the first aspect of the present invention, the current driving condition data, vehicle mass, and/or driving resistance and/or vehicle inclination, which are used as input data for a shifting strategy, are continuously calculated based on topographic data of a current position of the motor vehicle. According to a second aspect of the invention, which can be used in combination with the first aspect, the shifting strategy of the transmission control device determines a gear change based on topographic data of a defined distance ahead of the current position of the motor vehicle, wherein the defined distance ahead of the motor vehicle depends on the vehicle velocity of the motor vehicle.

BRIEF DESCRIPTION OF THE DRAWINGS

Preferred further developments of the invention will become apparent from the description that follows. An embodiment of the invention is described in more detail, without being restricted thereto, based on the sole FIGURE which shows:

a block diagram for illustrating the invention.

DETAILED DESCRIPTION OF THE PREFERRED EMBODIMENTS

The FIGURE shows a highly schematic representation of a drive train of a motor vehicle, wherein the drive train of the FIGURE comprises a drive assembly 1 and a transmission 2, wherein the transmission 2 is arranged between the drive assembly 1 and an output drive 3 of the drive train. The transmission 2 is preferably built as an automatic, or automated, transmission and converts rotational speeds and torques of the drive assembly 1 and thus provides the tractive power of the drive assembly 1 at the output drive 3. According to the FIGURE, a start-up clutch 4 is connected between the drive assembly 1 and the transmission 2.

An engine control device 5 is assigned to the drive assembly 1, and a transmission control device 6 is assigned to the transmission 2. The operation of the drive assembly 1 is controlled and/or regulated using the engine control device 5, for which purpose the drive assembly exchanges data 7 with the engine control device 5. The operation of the transmission 2 is controlled and/or regulated by transmission control device 6, for which purpose the transmission control device 6 exchanges data 8 with the transmission 2. According to the FIGURE, the engine control device 5 also exchanges data 9 with the transmission control device 6.

According to the FIGURE, the transmission control device 6 is supplied with not only the data 8 from the transmission 2, and data 9 from the engine control device 5, moreover the transmission control device 6 is provided with further data 10 from sensors 14 for example, on the basis of which the transmission control device 6 controls and/or regulates the operation of the transmission 2.

In addition, data 12 about the environment or topography of the motor vehicle is provided from a navigation device 11 to the transmission control device 6, specifically both data about the topography or environment of the current position of the motor vehicle as well as data about the topography or environment of motor vehicle of a defined distance ahead of the current position of the same motor vehicle.

The transmission control device 6 controls and/or regulates the operation of the transmission 2 on the basis of driving condition data and data about the driver's wishes. In particular, a shifting strategy, which determines a gear change from the current actual gear into a targeted gear on the basis of driving condition data and data about the driver's wishes, is implemented in the transmission control device 6.

For this purpose, the transmission control device 6 uses vehicle mass and/or driving resistance and/or vehicle inclination and/or vehicle velocity and/or vehicle acceleration and/or engine rotational speed and/or engine torque as driving condition data. Data about the actuation of an accelerator pedal and data about the actuation of the brake pedal of the motor vehicle in particular are supplied to the transmission control device 6 as data about the driver's wishes.

Engine rotational speed and/or engine torque are preferably provided from the engine control device 5 as data 9 to the transmission control device 6. The driving condition data, vehicle inclination and vehicle velocity as well as vehicle acceleration, are preferably supplied to the transmission control device 6 as data 10 from external sensors, where the vehicle acceleration can alternatively also be calculated within the transmission control device 6.

According to a first aspect of the invention, the transmission control device 6 continuously calculates the driving condition data, vehicle mass and/or driving resistance and/or vehicle inclination on the basis of topographic data 12 of a current position of the motor vehicle, so as to assure in the shifting strategy a more precise gear change, on the basis of such continuously determined driving condition data, providing a greatest possible agility of the motor vehicle with the lowest possible fuel consumption.

According to a preferred advantageous further development of the invention, upon switching on the ignition of the motor vehicle or during a standstill of the motor vehicle with the ignition switched on, the transmission control device 6 calibrates an inclination sensor, which is internal or external to the transmission, based on topographic data 12 of the current position of the motor vehicle.

For this purpose, the transmission control device 6 calculates the current vehicle inclination from the topographic data 12 of the current position of the motor vehicle, and with this corrects the corresponding measured value of the inclination sensor.

Preferably this calibration occurs every time the motor vehicle ignition is switched on, wherein if upon switching on the ignition of the motor vehicle no topographic data is available for the current position of the motor vehicle, the calibration is deferred until the next vehicle standstill, for example at the next red traffic light.

According to an advantageous further development of the invention, during travel of the motor vehicle, the transmission control device 6 continuously calculates the current driving resistance of the motor vehicle from the topographic data of the current position of the motor vehicle, aerodynamic resistance fraction, rolling resistance and a vehicle mass. In this context it can be provided that the transmission control device 6 calculates the current rolling resistance and also the rolling resistance coefficient from the topographic data of the current position of the motor vehicle, a current tractive force of the drive assembly 1, a current vehicle acceleration and a current aerodynamic resistance fraction. For this purpose, the current tractive force of the drive assembly 1 can be derived from the current engine torque. The current vehicle acceleration can be determined either through measurement or calculated from the current vehicle velocity. The rolling resistance and the rolling resistance coefficient are stored in a memory for later use.

Then, when a rolling resistance is established, the current driving resistance can also be calculated independently of the engine torque. In the case where the current driving resistance is calculated without considering the engine torque, the engine torque can be corrected from the engine rotational speed for specific driving situations, in which the engine torque is required, depending on characteristic values. The corrected values are stored in a memory.

According to another advantageous further development of the invention, during travel of the motor vehicle, the transmission control device 6 continuously calculates the current vehicle mass from the topographic data 12 of the current position, aerodynamic resistance, rolling resistance and from a current vehicle acceleration and/or a current tractive force. Again, for this purpose, the vehicle acceleration can be determined through measurement or calculation from the current vehicle velocity. The rolling resistance of a motor vehicle can either be given as a fixed variable or variably calculated from the current tractive force. Preferably the calculation of the current vehicle mass occurs during every startup of the motor vehicle from a standstill of the vehicle.

In this context it can be provided that the transmission control device 6 only recalculates the vehicle mass under specific driving conditions that depend on topographic data 12 of the current position of a motor vehicle. If the transmission control device 6 detects that a motor vehicle is stopped at an incline or a decline for example, it can be concluded that the vehicle mass has not changed, wherein the transmission control device 6 does not recalculate the vehicle mass upon start-up in the incline or in the decline. Furthermore, when the transmission control device 6 detects that the motor vehicle was stopped at a parking place for example, based on the topographic data 12 of the current position of the motor vehicle, it can be provided that the vehicle mass is not recalculated at the next start-up because in this case also it can be concluded that the vehicle mass has not changed. If, however, the transmission control device 6 detects, on the basis of topographic data 12 of the navigation system 11, that the motor vehicle has reached its destination, then it can be concluded that the mass of the motor vehicle has changed at the destination so that the vehicle mass is recalculated at the next start-up.

Thus, as described above, the transmission control device 6 according to the invention continuously calculates the driving conditions, vehicle mass and driving resistance and vehicle inclination on the basis of topographic data 12 of the current position of the motor vehicles, thus dependent on the current position and the current incline or the current decline of the motor vehicle, in order to control and/or regulate the operation of the transmission 2 more precisely on the basis of this currently calculated driving condition data, namely to guarantee minimum fuel consumption with the greatest possible agility. In particular, the shifting strategy of the transmission control device 6 determines, on the basis of this continuously calculated driving condition data, a gear change from a current gear into a targeted gear while guaranteeing low fuel consumption with great agility.

According to the second aspect of the invention, which can be used in combination with the details described above, the transmission control device 6 for controlling and/or regulating the operation of the transmission 2 uses not only the topographic data 12 of the current position of the motor vehicle, but also topographic data 12 of a defined distance ahead of the current position of motor vehicle. On the basis of the topographic data 12 of a defined distance ahead of the motor vehicle, the shifting strategy of the transmission control device 6 determines a gear change from a current actual gear into a targeted gear, and again also depending on the driving condition data and the data about the driver's wishes, wherein according to the second aspect of the invention the defined distance ahead of the motor vehicle, whose topographic data is used by the transmission control device 6 in the shifting strategy, depends on the vehicle velocity. Thus, the defined distance of the motor vehicle whose topographic data is used in the transmission control device 6, namely in the shifting strategy of the same, depends on the vehicle velocity such that the defined distance ahead of the motor vehicle is determined to be greater when the vehicle velocity is greater.

According to an advantageous further development of this aspect of the present invention, the transmission control device 6 modifies counter increment values of a shift monitor of the transmission control device 6, depending on an inclination which is determined based on the topographic data at the defined distance ahead of the motor vehicle. A shift monitor is fundamentally known from DE 10 2005 005 379 A1, where in terms of the invention, it is proposed that the counter increment values of such a shift monitor be modified based on the topographic data of a defined distance ahead of the motor vehicle.

In this context, the transmission control device 6 can modify the counter increment values of the shift monitor so that when the determined inclination of the motor vehicle at the defined distance ahead of the motor vehicle is flatter, the shift monitor blocks tractive downshifts. Furthermore, the transmission control device can modify the counter value increments of the shift monitor so that when the determined inclination of the motor vehicle at the defined distance ahead of the motor vehicle is steeper, the shift monitor blocks tractive upshifts.

Beyond this, depending on the topographic data at the defined distance ahead of the motor vehicle, the transmission control device 6 can calculate a driving resistance-dependent rotational speed offset that is used by the shifting strategy in order to modify the targeted rotational speed of upshifts in traction mode. Therefore, it is possible to increase the targeted rotational speed of upshifts in advance of an incline for example, so that such upshifts are no longer performed, and in contrast to a situation in which a decline is ahead of the motor vehicle. Here, targeted rotational speeds for upshifts in tractive mode are decreased, so that upshifts are performed earlier.

If the transmission control device 6 reads in the topographic data regarding the defined distance ahead of the motor vehicle that the motor vehicle is operating in city traffic, the transmission control device 6 can reduce or increase a driver's wish, which as a rule depends on actuation of an accelerator pedal, in the transmission control device 6. In the case of reducing the driver's wish, the transmission control device 6 simultaneously reduces a targeted rotational speed and a gear increment for an upshift in tractive mode, wherein a maximum torque of the drive assembly can be limited by an engine engagement triggered by the transmission control device. As a result fuel can be saved because in city traffic as a consequence of speed limitations, a higher driver's wish is generally unnecessary. If, by contrast, a driver's wish is internally increased by the transmission control device 6 in city traffic, the targeted rotational speed for an upshift in tractive mode is simultaneously increased, and the shiftable gear increment is reduced. Upshifts in tractive mode are then triggered later, wherein it is possible for the driver to decelerate the motor vehicle using the accelerator pedal.

Then, when the transmission control device 6 detects city traffic for the motor vehicle based on the topographic data of a defined distance ahead of the motor vehicle, the transmission control device 6 can also initiate a reduction of motor vehicle noise emissions. In this case, the transmission control device 6 can reduce targeted rotational speed and gear shifts for shifting, in particular for upshifts in tractive mode, so that the vehicle is driven with lower engine rotational speed and accordingly lower noise emission. Furthermore in this case, the transmission control device 6 can deactivate an engine brake and/or switch off an engine fan. For commercial vehicles in this case, the air compressors which are necessary for providing pneumatic auxiliary braking energy can be switched off for example.

In this context, the transmission control device 6 can switch on an air compressor in due time before city traffic in order to sufficiently fill an air tank. Furthermore, in city traffic the transmission control device 6 can influence engine control for performing shifts for delaying the torque build up and attainment, or start-up, of a synchronous rotational speed for engagement of a targeted gear.

If a crossing with a stop sign or a red traffic light, or a similar environmental situation of the motor vehicle is read based on topographic data of a defined distance ahead of the motor vehicle, the transmission control device 6 preferably internally increases a driver's wish, and a targeted rotational speed for an upshift is increased in tractive mode so that a upshift in tractive mode is performed later. If the transmission control device 6 reads a speed limitation from the topographic data lying ahead of the motor vehicle, the transmission control device influences the upshifts in tractive mode using engine engagement, so that the maximum speed is not exceeded by the engine engagement. If the transmission control device 6 detects from the topographic data applicable of a defined distance ahead of the motor vehicle that the motor vehicle is operated at high altitude, then for an upshift in tractive mode, a faster targeted rotational speed is set in order to compensate for a power loss of the drive assembly using the relocation to an operating point with higher available torque.

As already described, depending on an incline which the transmission control device determines from the topographic data of a defined location lying ahead of the motor vehicle, the transmission control device modifies counter increment values of a shift monitor of the transmission control device, and in particular for upshifts as well as for downshifts in tractive mode.

In this context, the shift monitor using appropriately modified counter value increments blocks tractive downshifts when the determined incline at the defined distance ahead of the motor vehicle is flatter.

A shifting rotational speed of a shifting strategy for downshifts in tractive mode is preferably influenced by a driving resistance-dependent rotational speed offset. As a result, the shifting rotational speed for downshifts in tractive mode can be reduced before an incline and, if applicable, a downshift can no longer be performed. The driving resistance and therefore also the driving resistance-dependent rotational speed offset is determined from the topographic data of a defined distance ahead of the motor vehicle. The transmission control device preferably also determines the gear increment to be implemented for a tractive downshift depending on this determined driving resistance-dependent rotational speed offset. Target rotational speeds for coasting or tractive downshifts (shifts that are triggered by actuating the accelerator pedal) are calculated by the transmission control device 6 analogously to tractive upshifts, depending on determined driving resistance-dependent rotation speed offset.

According to an advantageous further development, the transmission control device 6, according to the invention, determines a tractive force that is necessary for traveling an incline lying at a defined distance ahead of the motor vehicle. For this, from the engine data provided by the engine control device 5, the transmission control device 6 calculates a minimum rotational speed that the drive assembly needs for driving the incline, as well as an appropriate gear increment, and then triggers the particular gear change.

Likewise, for influencing coasting upshifts, the transmission control device 6 according to the invention evaluates the incline from the topographic data of a defined distance ahead of the motor vehicle.

When the transmission control device 6 detects that a plane follows a section of a decline, and with it a leveling off of the decline, the transmission control device 6 performs an upshift in coasting mode in order to reduce the engine braking effect of the drive assembly. In this context, the transmission control device 6 preferably triggers the upshift only when the plane that is adjacent to the decline has a minimum length. If however, the transmission control device 6 detects that a plane with city traffic follows a decline, the coasting upshift described above is suppressed.

If, evaluating topographic data at the defined distance ahead of the motor vehicle, the transmission control device 6 detects that a steep decline lies ahead of the motor vehicle or that the motor vehicle is located at the start of a longer section of a decline, the transmission control device 6 according to the invention blocks coasting up shifts, and in the transmission 2 only shifts are permitted in order to protect the drive assembly 1 from excessive rotational speed.

As already explained, the transmission control device 6 according to the invention continuously evaluates the topographic data of a defined distance ahead of the motor vehicle in order to determine progression of the incline, for example, at this defined distance ahead of the motor vehicle. If the transmission control device 6 according to the invention detects that the motor vehicle is currently located in a plane, but there is a decline following the plane, then the transmission control device 6 according to the invention calculates which gear must be engaged in the transmission 2, so that the motor vehicle in the decline can operate with constant drive speed through a braking effect of the driving assembly using a so-called (engine) drag moment of the engine, while considering the available continuous braking power in the vehicle which can be provided for example by an intarder, for example.

If the transmission control device 6 determines that the continuous breaking power is sufficient in order to travel the decline without a speed increase, then the transmission control device blocks coasting downshifts. In the other case, coasting downshifts are permissible. If necessary, the transmission control device 6 can in this case activate an engine fan to provide additional braking power in order to avoid downshifts in coasting mode.

The transmission control device 6 calculates targeted rotational speeds and gear increments for coasting downshifts in turn depending on a driving resistance or a driving resistance-dependent rotational speed offset that the transmission control device 6 calculates from the topographic data of a defined distance ahead of the motor vehicle.

If the transmission control device according to the invention detects from the topographic data of a defined distance ahead of the motor vehicle that a curve would not be drivable with the current vehicle speed, the transmission control device according to the invention triggers a downshift in coasting mode upon actuation of the operating brake, in order to attain a rotational speed level for the drive assembly with which a tractive mode of the motor vehicle is possible upon completion of the curve. This way, the transmission control device according to the invention makes a shift possible in a consumption-optimized rotational speed range of the drive assembly.

If the transmission control device 6 according to the invention detects a traffic circle from the topographic data of a defined distance ahead of the motor vehicle, then the transmission control device 6 triggers a coasting down shift with release of a brake pedal or with deactivation of the continuous braking, specifically in such a way that in a target gear of the gear change an acceleration reserve is provided for a tractive mode.

As a result, spontaneous entry into the traffic circle is possible. Upon attaining the entry into the traffic circle or at a set distance ahead of same, the transmission control device 6 triggers in turn a coasting downshift into a targeted gear in order to provide acceleration reserve for the tractive mode, and to enable a spontaneous entry into the traffic circle.

When the transmission control device 6 according to the invention detects a crossing with a traffic light from the topographic data at the defined distance ahead of the motor vehicle, coasting downshifts are blocked. If the transmission control device 6 according to the invention detects a highway on-ramp lane from the topographic data of a defined point lying ahead of the motor vehicle, coasting downshifts are automatically performed despite a possibly present decline so that upon actuation of an accelerator pedal is sufficient acceleration reserve is available for acceleration of the motor vehicle.

The transmission control device 6 according to the invention can calculate a fictitious driving resistance and an incline ahead of the motor vehicle from the topographic data at the defined distance ahead of the motor vehicle in order to decide whether a coasting mode or a sailing mode is reasonable for the motor vehicle. The transmission control device 6 can then automatically trigger the coasting mode or sailing mode.

When the transmission control device 6 according to the invention detects from the topographic data of a defined distance ahead of the motor vehicle that the motor vehicle is not located on a street, the shifting strategy for starting up the motor vehicle can be influenced in order to make it possible to start-up the motor vehicle safely in an off-road situation.

A shifting strategy for a start-up can also be influenced by the transmission control device 6 depending on the incline or the driving resistance which lies at the defined distance ahead of the motor vehicle.

The invention is also used preferably for transmission control devices for commercial vehicles such as trucks for example.

REFERENCE CHARACTERS

1 drive assembly
2 transmission
3 output drive
4 start-up clutch
5 engine control device
6 transmission control device
7 data
8 data
9 data
10 data
11 navigation device
12 data

The invention claimed is:

1. A transmission control device for at least one of controlling and regulating operation of either an automatic or an automated transmission of a motor vehicle, the transmission control device comprising:
 a shifting strategy which, is stored in the transmission control device, at least one of controls and regulates the operation of the transmission based on at least one of driving condition data, vehicle mass data, driving resistance data, vehicle inclination data, vehicle velocity data, vehicle acceleration data, engine rotational speed data, and engine torque data,
 the transmission control device is configured to continuously calculate at least one of current driving condition data, the vehicle mass data, the driving resistance data and the vehicle inclination data based on topographic data of a current position of the motor vehicle,
 the transmission control device, upon at least one of switching on an ignition and at a standstill of the motor vehicle with a switched on ignition, calibrates an inclination sensor based on the topographic data of the current position of the motor vehicle, and
 the transmission control device calculates, from the topographic data of the current position of the motor vehicle, a current vehicle inclination, and with the current vehicle inclination corrects a measured value of the inclination sensor.

2. The transmission control device according to claim 1, wherein the transmission control device, during travel of the motor vehicle, calculates a current driving resistance from the topographic data, of the current position of the motor vehicle, the current rolling resistance, the current aerodynamic resistance and from the vehicle mass data.

3. The transmission control device according to claim 2, wherein the transmission control device calculates the current rolling resistance from the topographic data of the current position of the motor vehicle, the current tractive force, the current aerodynamic resistance and from the current vehicle acceleration.

4. The transmission control device according to claim 3, wherein the transmission control device determines the current tractive force from a current engine torque and the current vehicle acceleration either by measurement or calculation from a current vehicle velocity.

5. The transmission control device according to claim 1, wherein the transmission control device during travel of the motor vehicle, is configured to calculate a current vehicle mass from at least one of the topographic data, of the current position of the motor vehicle, a current aerodynamic resistance, a current rolling resistance, current vehicle acceleration and current tractive force.

6. The transmission control device according to claim 1, wherein the transmission control, device during a start-up of the motor vehicle from a standstill, calculates the current vehicle mass.

* * * * *